United States Patent [19]

Uchino

[11] Patent Number: 5,966,523
[45] Date of Patent: Oct. 12, 1999

[54] METHOD OF ESTIMATING POWER CONSUMPTION OF SEMICONDUCTOR INTEGRATED CIRCUIT

[75] Inventor: Taku Uchino, Kanagawa-ken, Japan

[73] Assignee: Kabushiki Kaisha Toshiba, Kawasaki, Japan

[21] Appl. No.: 08/782,285

[22] Filed: Jan. 13, 1997

[30] Foreign Application Priority Data

Jan. 12, 1996  [JP]  Japan .................................... 8-004183

[51] Int. Cl.⁶ ...................................................... G06F 17/50
[52] U.S. Cl. ................................ 395/500.23; 395/500.35
[58] Field of Search ..................................... 364/489, 578, 364/490; 395/500

[56] References Cited

U.S. PATENT DOCUMENTS 5,682,320   10/1997   Khouja et al. ........................... 364/489

*Primary Examiner*—Kevin J. Teska
*Assistant Examiner*—Mark J. Fink
*Attorney, Agent, or Firm*—Foley & Lardner

[57] ABSTRACT

A method of estimating the power consumption of a semiconductor integrated circuit provides second data for primary inputs of a logic part in the integrated circuit and for nets that determine the signal value of a given net in the logic part. The second data has a multi-terminal Boolean approximation method (MTBAM) data structure. The method prepares first data having the MTBAM data structure from a probability contained in the second data, probabilities calculated according to third data contained in the second data and having a multi-terminal binary decision diagram (MTBDD) data structure, and fourth data generated from the third data and having the MTBDD data structure. According to the first data, the method estimates a probability for the given net. The method prepares such first data for all nets in the integrated circuit, and according to which, estimates the power consumption of the integrated circuit.

7 Claims, 4 Drawing Sheets

BAM DATA STRUCTURE

------- LEVEL 1
------- LEVEL 2

MTBDD FOR A{xi}

------- LEVEL 1
------- LEVEL 2

PRODUCT OF MTBDDs

OUTPUT OF LATCH 3 (INTERNAL OUTPUT)

X : PRIMARY INPUT
A : SET OF EXTERNAL INPUTS
S : OUTPUT OF LATCH GROUP 7 (INTERNAL OUTPUT)

METHOD OF ESTIMATING POWER CONSUMPTION OF SEMICONDUCTOR INTEGRATED CIRCUIT

BACKGROUND OF THE INVENTION

1. Field of the Invention

The present invention relates to a method of estimating the power consumption of a semiconductor integrated circuit, and particularly, to one that estimates the power consumption according to the signal and switching probabilities of each logic circuit incorporated in the integrated circuit.

2. Description of the Prior Art

A semiconductor integrated circuit such as a CMOS integrated circuit consumes power largely when the capacitance of each net of wires contained in the circuit is charged or discharged. The power consumption of a net N in the circuit is estimated as follows:

$$PWR(N) = \tfrac{1}{2} VDD^2 \cdot CN \cdot f \cdot PSWT(N) \tag{1}$$

where PWR(N) is the power consumption of the net N, VDD is a source voltage, CN is the capacitance of the net N, f is a clock frequency, and PSWT(N) is the switching probability of the net N.

The switching probability of the net N is the probability of the net N of changing its logical value from 0 to 1, or from 1 to 0. The signal probability of the net N is the probability of the net N of providing 1 and is represented with PSIG(N).

VDD and f in the expression (1) are known, and CN is calculable. Accordingly, the power consumption PWR(N) is calculable if the switching probability PSWT(N) is obtained.

The switching probability of a given circuit can be estimated by simulation or by calculation.

The simulation is made by applying pattern data, i.e., test vectors to primary input terminals of the circuit and by measuring the number of switching times of the output of each net contained in the circuit.

The accuracy of the simulation will improve if the test vectors are extended. This, however, elongates a testing time.

On the other hand, the probability calculation employs no test vectors. This technique provides the signal and switching probabilities of primary inputs to a circuit and calculates the propagation of the probabilities to internal nets of the circuit. The probability calculation completes in a short time because it employs no test vectors. The accuracy thereof, however, is relatively low.

The probability calculation has been developed mainly in the field of combinational circuits but not in the field of sequential circuits because the sequential circuits involve peculiar difficulties. These difficulties and a prior art to cope with them will be explained.

FIG. 7 shows a sequential circuit 9 consisting of a combinational logic part 5 and a latch group 7. All latches in the latch group 7 are edge trigger latches that transfer an input to an output terminal only when a clock signal changes from 0 to 1, and in the other cases, keep the output terminal unchanged. Accordingly, the latch group 7 serves as a delay element whose delay time is equal to a clock period, i.e., a unit time.

The logic part 5 is made of logic elements such as NANDs and ORs. The delay of each logic element is ignored. The logic part 5 receives external inputs from an external circuit as well as internal inputs, which are outputs of the latch group 7. Outputs of the logic part 5 are internal inputs to the latch group 7.

The external inputs are dependent on primary inputs. Logical values of the internal inputs determine the state of the sequential circuit 9. The primary inputs are independent of one another and have each temporal autocorrelation.

In FIG. 7, a set of the primary inputs is expressed as X={X1 to Xn}, a set of the external inputs as A={A1 to Am}, and a set of the internal inputs as S={S1 to Sl}.

Symbols used for probabilities will be explained.

The probability of a logical function f of providing a logical value of 1 is P(f), which has temporal translation invariance. If the logical function f is dependent on time t1 to tp, the following is true for any number:

$$P(f(t1, \ldots, tp)) = P(f(t1+t, \ldots, tp+t)) \tag{2}$$

Then, the signal and switching probabilities of a net N are expressed as follows:

$$PSIG(N) = P(N), \tag{3}$$

$$PSWT(N) = P(N(1)\overline{N}(0)) + P(\overline{N}(1)N(0)) \tag{4}$$

where N(t) is a logical value provided by the net N at time t. This expression does not positively show temporal dependency because of the temporal translation invariance of the probability.

It is known that the following is identically true:

$$P(N(1)\overline{N}(0)) = P(\overline{N}(1)N(0))$$

Accordingly, the switching probability of the net N is expressed as follows:

$$P_{SWT}(N) = 2P(N(1)\overline{N}(0)) \tag{5}$$

$$= 2P(\overline{N}(1)N(0))$$

Independence of logical functions will be defined.

Logical functions f and g are independent of each other if logical functions F(f) and G(g) that are dependent only on f and g, respectively, are as follows:

$$P(F(f)G(g)) = P(F(f))P(G(g)) \tag{6}$$

Namely, if the logical functions f and g are independent of each other, the following stands:

$$P(fg) = P(f)P(g) \tag{7}$$

$$P(f(t1)g(t1)f(t2)g(t2)) = P(f(t1)f(t2))P(g(t1)g(t2)) \tag{8}$$

where f(t) and g(t) are logical values at time t.

Next, the difficulties in calculating the signal and switching probabilities of a sequential circuit will be explained.

Generally, the probability of an output from a gate is calculated on an assumption that the probability of each input to the gate is known. In the sequential circuit 9 of FIG. 7, the logical values of the internal inputs are equal to the one-clock-behind logical values of the internal outputs, and the logical values of the internal outputs are logical functions of the concurrent logical values of the internal inputs. Namely, the logical values of the internal inputs are dependent on the one-clock-behind logical values of themselves. This is expressed as follows:

$$S(t) = F(S(t-1), A(t-1)) \tag{9}$$

where F is a Boolean vector function determined by the structure of the logic part 5, and S and A are Boolean vectors defined as follows:

$$S(t) \stackrel{def}{=} (S_1(t), \ldots, S_1(t)) \quad (10)$$

$$A(t) \stackrel{def}{=} (A_1(t), \ldots, A_m(t)) \quad (11)$$

where Sk(t) (k=1 to 1) and Ai(t) (i=1 to m) are logical values at time t. As is apparent in the expression (9), there is contradiction that the probability of an internal input to a sequential circuit is calculable if itself is known. This is a dilemma in calculating the signal and switching probabilities of a sequential circuit.

A prior art to cope with the dilemma will be explained.

The expression (9) is recurrent with respect to S, and S(k) is expressible with A(0) to A(k−1) and S(0). For example, S(2) is expressed with A(0), A(1), and S(0) as follows:

$$S(2)=F(F(S(0), A(0)), A(1)) \quad (12)$$

Recurrently using the expression (9) is equivalent to unrolling the sequential circuit in question. FIG. 8 shows the sequential circuit of FIG. 7 unrolled k times where k is an unroll number. Unrolling a sequential circuit is equal to converting the same into a combinational circuit. The unroll number k is determined according to correlation among the internal inputs. This technique handles S(0) as an additional primary input, to approximate the correlation among the signals. Increasing the unroll number k will increase accuracy of the approximation.

The signal probability of the unrolled circuit is expressed as follows:

$$P(S(k))=P(S(0)) \quad (13)$$

A probability P(S(t)) at time t is a vector having real numbers as follows:

$$P(S(t)) \stackrel{def}{=} (P(S_1(t)), \ldots, P(S_1(t))) \quad (14)$$

The expression (13) considers S(k) as a function of A(0) to A(k−1) and S(0).

The expression (13) can be approximated according to Picard-Peano method or Newton-Raphson method. The Picard-Peano method will be explained.

1. Step 1 sets any value, for example, 0.5 for P(S(0)) and sets f=0.

2. Step 2 calculates the signal probability P(S(k)) of the output S(k) of the unrolled circuit.

3. Step 3 substitutes the calculated probability P(S(k)) for P(S(0)).

4. Step 4 increments f by one. If f<fmax, then step 2 is carried out, and if not, the method ends.

This method is an unroll feedback method. The value fmax used in step 4 is a feedback number. Accuracy of the calculated signal probability and calculation time of this method are dependent on the probability calculation carried out in step 2.

If the probability calculation is improper, an error will be enlarged whenever the feedback operation is carried out. Since the unrolled circuit is a combinational circuit, the probability calculation may be made according to a conventional method suitable for the combinational circuit.

The unrolled circuit most consider temporal correlation among the external inputs A(0) to A(k−1). In this regard, the prior art mentioned above is incapable of providing an accurate result because it is based on a delay-zero model that never considers the temporal correlation among external inputs. It is necessary to provide a probability calculation method that considers temporal correlation among external inputs in estimating the power consumption of a sequential circuit.

In "Exact and Approximate Methods for Calculating Signal and Transition Probabilities in FSMs" in Proceedings of the 31st Design Automation Conference, pp. 18–23, 1994, C. Y. Tsui, M. Pedram, and A. M. Despain have disclosed a probability calculation method that forms a binary decision diagram (BDD) for covering the whole of an unrolled circuit, to realize utmost accuracy. Calculation time of this method exponentially increases with respect to the product of an unroll number and the number of external inputs. Accordingly, this method is inapplicable to a large-scale sequential circuit.

To reduce calculation time, it is necessary to form a binary decision diagram not for the whole of an unrolled circuit and to directly calculate the probability of the output of each logic part according to the probabilities of inputs thereto. This is called an incremental method. A simplest form of the incremental method ignores correlation. This is called a completely uncorrelated model. This model approximates the switching probability of a net N as follows:

$$PSWT(N) \approx 2P(N) \, P(\overline{N}) \quad (15)$$

This model approximates the signal probability of an output Z of a 2-input AND gate as follows:

$$P(Z) \approx P(A) \, P(B) \quad (16)$$

where A and B are inputs to the 2-input AND gate. Calculation time of the completely uncorrelated model is proportional only to the scale of an unrolled circuit, and therefore, is shortest among all probability calculation models. Its calculation error, however, is very large and reaches even 100% because it completely ignores correlation among signals.

As explained above, the conventional methods are incapable of accurately estimating the switching probability, i.e., power consumption of a large-scale sequential circuit.

SUMMARY OF THE INVENTION

An object of the present invention is to provide a method of estimating the power consumption of a semiconductor integrated circuit, even of a large-scale one according to accurate and high-speed calculations of the signal and switching probabilities of the circuit.

In order to accomplish the object, the present invention provides a method of estimating the power consumption of a semiconductor integrated circuit according to the signal and switching probabilities of nets (Nn: n=1 to N) in each of logic parts that form the integrated circuit. The method calculates the signal and switching probabilities of each net (Ni) according to first data prepared for the net. The first data has a multi-terminal Boolean approximation method (MTBAM) data structure represented with the following expression:

$$(A): P(AB) \simeq P(A)P(B) + \sum_{i=1}^{n} (P(A\{x_i\}B\{x_i\}) - P(A\{x_i\})P(B\{x_i\})),$$

$$(AB)\{x_i\} \simeq A\{x_i\}B\{x_i\} \qquad (i = 1, \ldots, n).$$

The method includes the steps of providing second data for primary inputs (Xn: n=1 to N), which are supplied to the logic part in question, and for front nets (Ni−1, Ni−2) that are present in front of the net (Ni) in question and determine a signal value of the net (Ni), the second data having the MTBAM data structure represented with the expression (A); and preparing the first data for the net (Ni) according to a probability contained in the second data, probabilities calculated according to third data contained in the second data and having a multi-terminal binary decision diagram (MTBDD) data structure, and fourth data generated from the third data and having the MTBDD data structure. The MTBDD data structure is expressed as follows:

$$(B): N\{x_i\} = \sum_{\alpha l=0}^{1} \cdots \sum_{\alpha k=0}^{1} x_i^{\alpha 1}(0) \ldots x_i^{\alpha k}(k-1) \cdot P(N[x_i^{\alpha 1}(0) \ldots x_i^{\alpha k}(k-1)]).$$

If signal values of the nets (Nn) at a time point are determined by signal values of the nets (Nn) of a preceding time point, the method may provide the second data for a specific partial set of the nets (Nn) and prepare the first data sequentially for the nets (Nn).

The third data having the MTBDD data structure consists of terminal nodes representing probabilities and non-terminal nodes representing input variables serving as logical function data, and the method calculates the probability of the third data as the sum of products each calculated by multiplying a probability allocated to a branch from a root to a terminal node by a probability allocated to the terminal node.

The method may generate the fourth data as a negation of the third data so that a non-terminal node of the fourth data may have an input variable allocated to a corresponding non-terminal node of the third data, and a terminal node of the fourth data may have a probability that is calculated by subtracting 1 from a probability allocated to a corresponding terminal node of the third data.

The method may generate the fourth data as the sum or product of data A and B each having the MTBDD data structure consisting of terminal nodes representing probabilities and non-terminal nodes representing input variables serving as logical function data. The method forms a non-terminal node of the fourth data from a node of the data A and a node of the data B which are found according to a depth-first search technique and one of which is a non-terminal node. The method forms a terminal node of the fourth data from a terminal node of the data A and a terminal node of the data B with a probability allocated to the terminal node of the fourth data being the sum or product of probabilities of the terminal nodes of the data A and B.

DETAILED DESCRIPTION OF THE EMBODIMETNS

Figure 1:
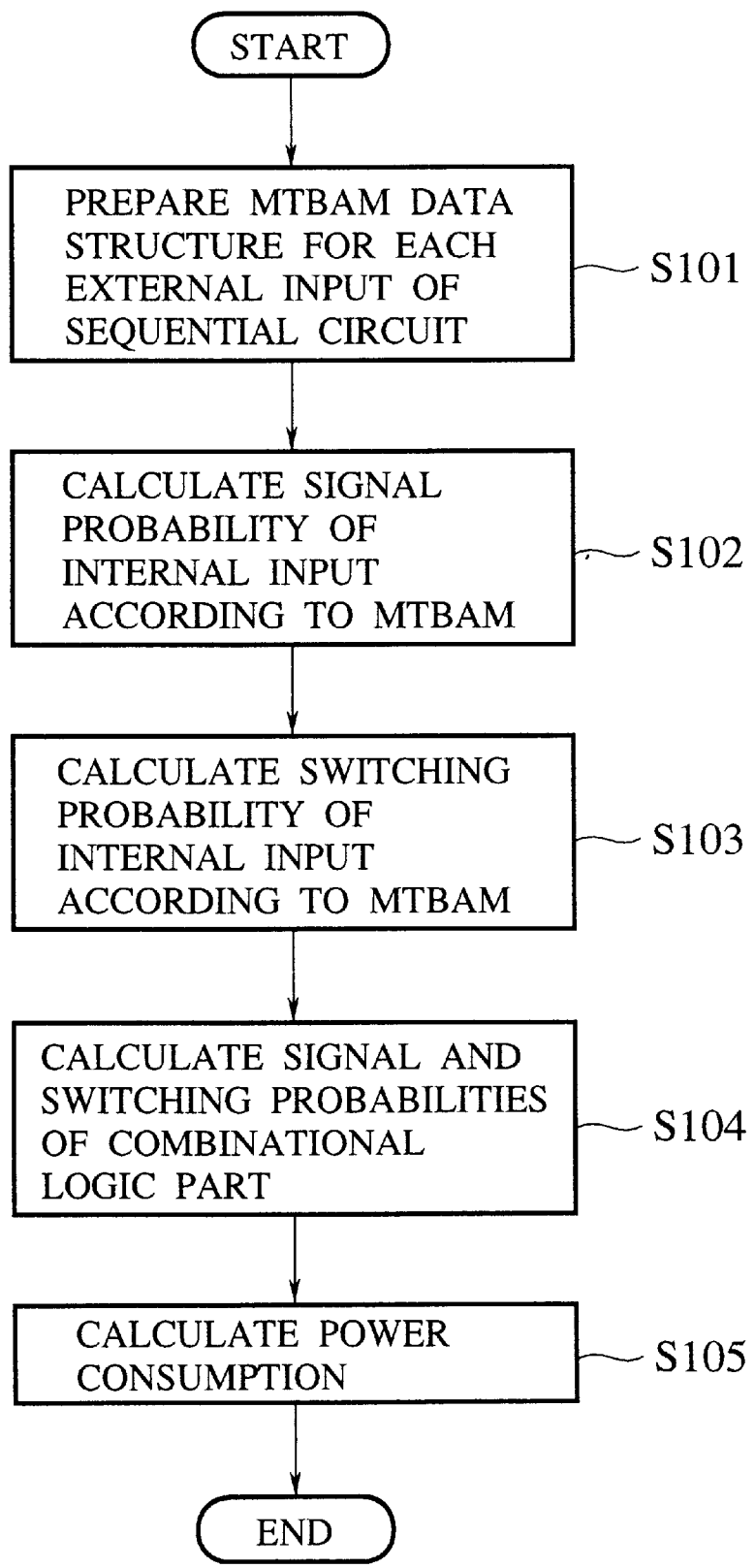
FIG. 1 is a flowchart showing the steps of estimating the power consumption of a semiconductor integrated circuit according to the present invention.

FIG. 1 is a flowchart showing the steps of estimating the power consumption of a semiconductor integrated circuit according to an embodiment of the present invention.

Japanese Unexamined Patent Publication No. 07-055867 discloses a Boolean Approximation Method (BAM) for calculating the signal and switching probabilities of a combinational circuit. The present invention expands the BAM into a multi-terminal Boolean approximation method (MTBAM) to deal with a sequential circuit. Namely, step S102 of FIG. 1 calculates the signal probability of a sequential circuit, steps S103 and S104 calculate the switching probability of the same, and step S105 calculates the power consumption of the same, each step being carried out according to the MTBAM.

The BAM for handling a combinational circuit as a delay-zero model disclosed in the Japanese Unexamined Patent Publication No. 07-055867 will be explained.

Figure 2:
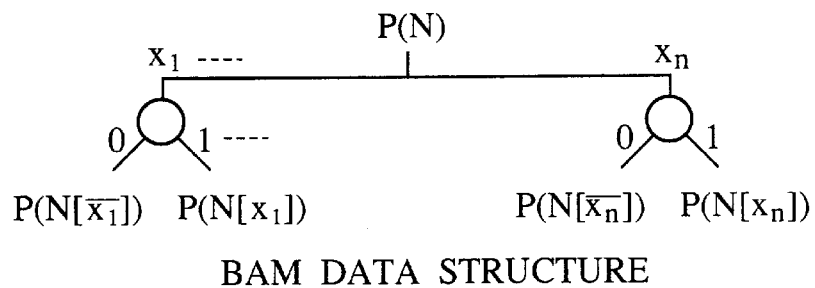
FIG. 2 shows an example of a conventional BAM (Boolean approximation method) data structure.

FIG. 2 shows a BAM data structure used for calculating the signal probability of a combinational logic circuit. The BAM data structure prepared for a given net N in the circuit has 2n+1 real numbers including a signal probability P(N) and cofactor probabilities $P(N[\overline{xi}])$ and $P(N[xi])$ (i=1 to n), where x1 to xn are primary inputs to the circuit, and $N[\overline{xi}]$ and $N[xi]$ are cofactors for a primary input xi. The cofactors are defined according to Shannon's expansion theorem as follows:

$$N = \overline{xi}\, N[\overline{xi}] + xi\, N[xi] (i=1, \ldots, n) \qquad (17)$$

A basic BAM expression for calculating the signal probability of the combinational logic circuit is as follows:

$$N\{x_i\} \stackrel{def}{=} \overline{x}_i \cdot P(N[\overline{x}_i]) + x_i \cdot P(N[x_i]) \quad (i = 1, \ldots, n) \qquad (18)$$

where N{xi} is a mixture of Boolean algebraic elements ($\overline{xi}$, xi) and real-number-field elements $P(N[\overline{xi}])$ and $P(N[xi])$ and is called a Boolean number. In the Boolean number, a Boolean variable portion is a Boolean algebraic element and a real number portion is a real-number-field element. The product, sum, negation, and probability of Boolean numbers are defined as follows:

$$A\{x_i\}B\{x_i\} \stackrel{def}{=} \overline{x}_i \cdot (P(A[\overline{x}_i])P(B[\overline{x}_i])) + x_i \cdot P(A[x_i])P(B[x_i])) \qquad (19)$$

$$A\{x_i\}B\{x_i\} \stackrel{def}{=} \overline{x}_i \cdot (P(A[\overline{x}_i]) + P(B[\overline{x}_i])) + x_i \cdot (P(A[x_i]) + P(B[x_i])) \qquad (20)$$

$$\overline{A\{x_i\}} \stackrel{def}{=} \overline{x}_i \cdot (1 - P(A[\overline{x}_i]) + x_i \cdot (1 - P(A[\overline{x}_i])) \qquad (21)$$

$$P(A\{x_i\}) \stackrel{def}{=} P(\overline{x}_i)P(A[\overline{x}_i]) + P(x_i)P(A[x_i]) \qquad (22)$$

where A{xi} and B{xi} are optional Boolean numbers. When calculating the product of Boolean numbers, the Boolean algebraic elements xi thereof are subjected to Boolean algebraic operations such as xixi=xi and $xi\overline{xi}$=0, and the cofactor probabilities $P(A[\overline{xi}])$ and $P(B[xi])$ thereof are handled as real numbers.

With the symbols mentioned above, the logical product AB of logical functions A and B and the cofactor probability of the logical product AB are as follows:

$$P(AB) \simeq P(A)P(B) + \sum_{i=1}^{n}(P(A\{x_i\}B\{x_i\}) - P(A\{x_i\})P(B\{x_i\})) \quad (23)$$

$$(AB)\{x_i\} \simeq A\{x_i\}B\{x_i\} \quad (i=1,\ldots,n) \quad (24)$$

The expression (24) is written as follows by comparing the coefficients of $\overline{xi}$ and $xi$ on both sides of the expression:

$$P((AB)[\overline{xi}]) \simeq P(A[\overline{xi}])P(B[\overline{xi}])$$

$$P((AB)[xi]) \simeq P(A[xi])P(B[xi]) (i=1,\ldots,n) \quad (25)$$

The expressions (23) and (24) are basic BAM expressions. For the sake of simplicity, the right side of the expression (23) is written as P(A)*P(B).

A procedure for applying the BAM for a logic part will be explained.

The logic part provides an output Z and receives inputs A1 to Am. If a BAM data structure for each of the inputs A1 to Am is known, a BAM data structure for the output Z is obtainable. This will be explained. Since the output Z is a logical function of the inputs A1 to Am, the Shannon's expansion theorem is applied thereto as follows:

$$Z = \overline{A1}\ Z[\overline{A1}] + A1\ Z[A1] \quad (26)$$

Then, the following is obtained:

$$P(Z) = P(\overline{A1}\ Z[\overline{A1}]) + P(A1\ Z[A1]) \quad (27)$$

The logical-product probabilities in the expression (27) are rewritten according to the expression (23) as follows:

$$P(Z) \simeq P(\overline{A1})*P(Z[\overline{A1}]) + P(A1)*P(Z[A1]) \quad (28)$$

Similarly, each cofactor probability of the output Z is as follows:

$$Z\{xi\} \simeq \overline{A1}\{xi\}Z[\overline{A1}]\{xi\} + A1\{xi\}Z[A1]\{xi\}(i=1,\ldots,n) \quad (29)$$

To actually calculate these expressions, BAM data structures for $Z[\overline{A1}]$ and $Z[A1]$ must be known. Accordingly, $Z[\overline{A1}]$ and $Z[A1]$ are subjected to the Shannon's expansion theorem with another gate input such as A2. For example, $Z[A1]$ is expressed as follows according to the Shannon's expansion theorem:

$$Z[A1] = \overline{A2}Z[A1\ \overline{A2}] + A2\ Z[A1A2] \quad (30)$$

This expression is again rewritten according to the expressions (23) and (24). In this way, the Shannon's expansion theorem is sequentially applied for the inputs A1 to Am, to obtain the BAM data structure for the output Z.

The above procedure is carried out on each gate from the primary input side of the circuit to the primary output side thereof, to obtain the signal probabilities of all nets in the circuit. The BAM is a kind of an incremental method because it calculates a BAM data structure for the output of each logic part according to BAM data structures for inputs thereto.

A method of expanding the BAM to deal with a sequential circuit will be explained.

As explained above, it is necessary, when calculating the signal and switching probabilities of an unrolled circuit, to consider temporal autocorrelation in external inputs, or primary inputs that affect the external inputs.

The conventional BAM is unable to deal with such autocorrelation because it is a zero-delay model. Namely, the expression (17) that determines a BAM data structure is based on a zero-delay model. The expression (17) is written as follows if the temporal dependency thereof is positively expressed:

$$N(t) = \overline{xi}(t)N[\overline{xi}(t)] + xi(t)N[xi(t)] \quad (i=1,\ldots,n) \quad (31)$$

The expression (31) indicates that a logical value of the net N at time t is dependent only on logical values of the primary inputs at the time t because of the zero-delay model.

On the other hand, the logical value of the net N in the unrolled circuit is dependent on the external inputs, which are dependent on the logical values of the primary inputs at time 0 to k−1. Accordingly, the net N and the primary inputs xi are expressed as follows according to the Shannon's expansion theorem:

$$N = \sum_{\alpha 1=0}^{1} \ldots \sum_{\alpha k=0}^{1} x_i^{\alpha 1}(0) \ldots x_i^{\alpha k}(k-1) N[x_i^{\alpha 1}(0) \ldots x_i^{\alpha k}(k-1)] \quad (32)$$

The expression (32) employs the following definitions:

$$x_i^0 \overset{def}{=} \overline{x}_i, \quad x_i^1 \overset{def}{=} x_i$$

In the expression (32), the following represents cofactors for the primary inputs xi of the net N:

$$N[xi^{\alpha 1}(0) \ldots xi^{\alpha k}(k-1)]$$

The expression (17) of the conventional BAM involves only two cofactors, and therefore, has spaces for storing only two cofactor probabilities. On the other hand, the expression (32) indicates that the number of cofactors is not always two. Accordingly, the BAM data structure must be expanded to store all cofactor probabilities.

To achieve this, Boolean numbers must be expanded. Similar to introducing the Boolean number expression (18) for the expression (17), the following expanded Boolean number expression is introduced for the expression (32):

$$N\{x_i\} = \sum_{\alpha 1=0}^{1} \ldots \sum_{\alpha k=0}^{1} x_i^{\alpha 1}(0) \ldots x_i^{\alpha k}(k-1) \cdot P(N[x_i^{\alpha 1}(0) \ldots x_i^{\alpha k}(k-1)]) \quad (33)$$

Similar to the conventional Boolean numbers, the expanded Boolean numbers are each composed of the following Boolean algebraic portion:

$$(xi^{\alpha 1}(0) \ldots xi^{\alpha k}(k-1))$$

and the following real number portion:

$$(P(N[xi^{\alpha 1}(0) \ldots xi^{\alpha k}(k-1)])$$

Figure 3:
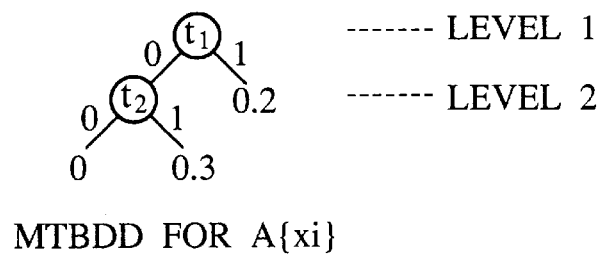
FIG. 3 shows an example of an MTBDD (multi-terminal binary decision diagram) used by the present invention.

An expanded Boolean number is expressed with a multi-terminal binary decision diagram (MTBDD). The MTBDD expresses the Boolean algebraic portion of the expanded Boolean number (or simply called the Boolean number). A real number added to a terminal of the MTBDD is a real number portion of the Boolean number. FIG. 3 shows an MTBDD representing a Boolean number A{xi}, which is defined as follows:

$$A\{xi\} = \overline{xi}(t1)xi(t2) \cdot 0.3 + xi(t1) \cdot 0.2 \quad (34)$$

Nodes of the MTBDD of FIG. 3 correspond to primary inputs xi(t1) and xi(t2) applied at time t1 and t2. The closer a given node to the root of the MTBDD, the smaller a value allocated to the node. A method of finding a cofactor probability of $\overline{xi}(ti)xi(t2)$ will be explained. Starting from the root of the MTBDD, a branch having a value 0 (0-branch) is traced. Thereafter, a branch having a value 1 (1-branch) is traced. Then, a terminal node having a value of 0.3 is reached. This is the cofactor probability of $\overline{xi}(ti)xi(t2)$ as is found in the expression (34).

Product, sum, negation, and probability operations on Boolean numbers will be explained.

Product of Boolean numbers

Boolean numbers correspond to MTBDDs, and therefore, the product of Boolean numbers is obtained if the product of corresponding MTBDDs is obtained. General rules of such a product will be explained.

The product of MTBDDs A and B provides an MTBDD Z. Depth-first search is carried out from the roots of the MTBDDs A and B, to generate nodes of the MTBDD Z. If the depth-first search finds nodes a and b in the MTBDDs A and B, the product of the nodes a and b generates a node z of the MTBDD Z.

(1) If the nodes a and b are terminal nodes, the product of real values at the nodes a and b is given to the node z. In this case, the node z is a terminal node.

(2) If one, for example b, of the nodes a and b is a terminal node, or if none of the nodes a and b is a terminal node and if the nodes a and b temporally differ from each other, for example, the node b is temporally behind the node a, the product of a node (0-child) obtained by tracing a 0-branch from the node a and the node b provides a 0-child of the node z. And the product of a node (1-child) obtained by tracing a 1-branch from the node a and the node b provides a 1-child of the node z.

(3) If none of the nodes a and b is a terminal node and if the nodes a and b are temporally equal to each other, the product of a 0-child of the node a and a 0-child of the node b provides a 0-child of the node z, and the product of a 1-child of the node a and a 1-child of the node b provides a 1-child of the node z.

Figure 4:
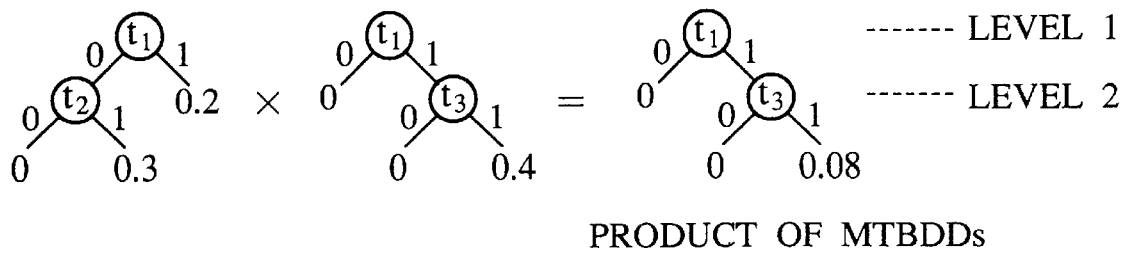
FIG. 4 shows an example of the product of MTBDDs used by the present invention.

These product rules closely resemble standard BDD (binary decision diagram) product rules. They differs only in that the standard BDD product rules provide a Boolean algebraic product and the MTBDD product rules provide a real-number-field product. FIG. 4 shows an MTBDD representing the Boolean number A{xi} of the expression (34) and an MTBDD representing the following Boolean number B{xi}:

$$B\{xi\}=xi(t1)xi(t3)\cdot 0.4 \quad (35)$$

The product of the Boolean numbers A{xi} and B{xi} may be calculated by separately handling Boolean algebraic portions and real number portions as follows:

$$= (\overline{x}_i(t_1)x_i(t_2)\cdot 0.3 + x_i(t_1)\cdot 0.2)(x_i(t_1)x_i(t_3)\cdot 0.4)$$

$$= (\overline{x}_i(t_1)x_i(t_2)x_i(t_1)x_i(t_3))\cdot (0.3\times 0.4) + (x_i(t_1)x_i(t_1)x_i(t_3))\cdot$$

$$(0.2\times 0.4)$$

$$= 0\cdot 0.12 + x_i(t_1)x_i(t_3)\cdot 0.08$$

$$= x_i(t_1)x_i(t_3)\cdot 0.08$$

A result of the above calculations completely corresponds to FIG. 4.

Sum of Boolean numbers

The rules (1) to (3) for the product of Boolean numbers are applicable as rules for the sum of Boolean numbers only by replacing "product" with "sum" in the rules.

Negation of Boolean number

The negation of a Boolean number of N{xi} is $\overline{(N\{xi\})}$, and the cofactor probability of the negated Boolean number is obtained by subtracting 1 from the cofactor probability of the Boolean number N{xi}. More precisely, the negation of the Boolean number N{xi} of the expression (33) is as follows:

$$\overline{N\{x_i\}} = \qquad (37)$$

$$\sum_{\alpha 1=0}^{1}\cdots\sum_{\alpha k=0}^{1} x_i^{\alpha 1}(0)\ldots x_i^{\alpha k}(k-1)\cdot(1-P(N[x_i^{\alpha 1}(0)\ldots x_i^{\alpha k}(k-1)]))$$

Probability of Boolean number

The probability P(N{xi}) of the Boolean number N{xi} is the sum of the products of the probability of each Boolean algebraic portion and each real number. More precisely, the probability of the Boolean number N{xi} of the expression (33) is as follows:

$$P(N\{x_i\}) = \qquad (38)$$

$$\sum_{\alpha 1=0}^{1}\cdots\sum_{\alpha k=0}^{1} x_i^{\alpha 1}(0)\ldots x_i^{\alpha k}(k-1)\cdot P(N[x_i^{\alpha 1}(0)\ldots x_i^{\alpha k}(k-1)])$$

where x is the product of real numbers.

Markov property is assumed on the primary inputs, to calculate the following:

$$P(xi^{\alpha 1}(0)\ldots xi^{\alpha k}(k-1))$$

According to the present invention, the Markov property means that the value of a primary input at time t is dependent only on the value of the same primary input at time t−1, i.e., one clock before and is independent of any signal value before the time t−1. This is expressed as follows:

$$P(xi^\alpha(t)|xi^\beta(t-1)xi^\gamma(t-2)=P(xi^\alpha(t)|xi^\beta(t-1)) \; (\alpha,\, \beta,\, \gamma=0,\, 1) \qquad (39)$$

In this expression, the following is a conditional probability:

$$P(f|g) \stackrel{def}{=} P(fg)/P(g)$$

The conditional probability is the probability of a logical function f of taking 1 under the condition that a logical value of a logical function g is defined as 1.

The following conditional probability is calculable according to the signal and switching probabilities of a corresponding primary input:

$$P(xi^\alpha(t)|xi^\gamma(t-1)) \; (\alpha,\, \beta=0,\, 1)$$

Accordingly, an optional probability mentioned below is calculable by assuming the Markov property on it:

$$P(xi^{\alpha 1}(t1)\ldots x^{\alpha k}(tk))$$

For example, the following probability is calculable:

$$P(\overline{xi(t1)}xi(t2)xi(t3)) = P(\overline{xi(t1)}|xi(t2))P(xi(t2)|xi(t3))P(xi(t3))$$

where t1>t2>t3

Figure 5:
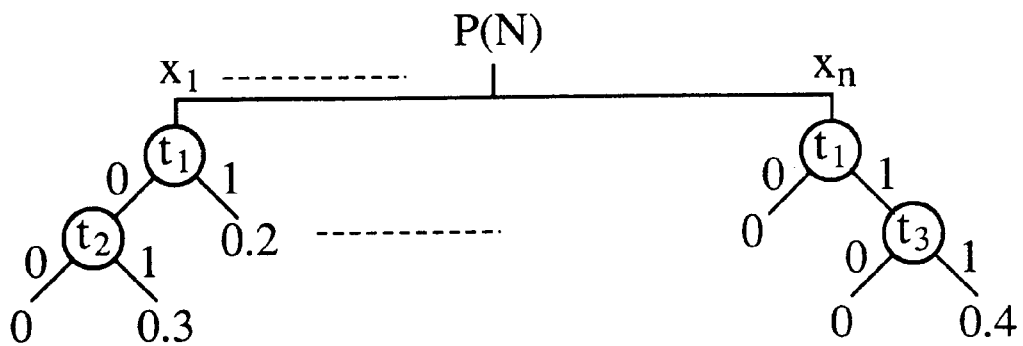
FIG. 5 shows an example of an MTBAM (multi-terminal Boolean approximation method) data structure used by the present invention.

Since the cofactor probability portion of the BAM data structure is expanded as mentioned above, the BAM data structure itself must be expanded. Namely, the probability P(N) of an optional net N in a given circuit is represented with a multi-terminal binary decision diagram (MTBDD) having cofactor probabilities for primary inputs xi (i=1 to n) at terminal nodes, as shown in FIG. 5.

Basic expressions (41) and (42) mentioned below for the expanded BAM data structure resemble the expressions (23) and (24). Unlike the expressions (23) and (24), the expressions (41) and (42) involve expanded Boolean numbers that are expressed with the MTBDD.

$$P(AB) \simeq P(A)P(B) + \sum_{i=1}^{n} (P(A\{x_i\}B\{x_i\}) - P(A\{x_i\})P(B\{x_i\})), \quad (41)$$

$$(AB)\{x_i\} \simeq A\{x_i\}B\{x_i\} \quad (i = 1, \ldots, n) \quad (42)$$

where A and B are optional logical functions. For the sake of simplicity, the right side of the expression (41) is represented as P(A)*P(B).

In this way, the MTBDD is used to expand the data structure and basic expressions of the BAM into an MTBAM (multi-terminal Boolean approximation method) involving an MTBAM data structure and basic MTBAM expressions.

Similar to the BAM data structure used for estimating the power consumption of a semiconductor integrated circuit, the MTBAM data structure is applicable to estimate the power consumption of an optional logic part. This will be explained.

A given logic part receives inputs A1 to Am and provides an output Z, which is a logical function of the inputs A1 to Am. The output Z is expressed according to the Shannon's expansion theorem as follows:

$$Z = \overline{A1}\, Z[\overline{A1}] + A1 Z[A1] \quad (43)$$

If an MTBAM data structure for each of the inputs A1 to Am is known, an MTBAM data structure for the output Z is obtainable. This will be explained.

The signal probability P(Z) of the output Z is expressed as follows according to the expression (43):

$$P(Z) = P(\overline{A1}\, Z[\overline{A1}]) + P(A1\, Z[A1]) \quad (44)$$

In the expression (44), the following are logical product probabilities:

$$(\overline{A1}\, Z[\overline{A1}]),\ P(A1\, Z[A1])$$

By applying the expression (41) to these probabilities, the following is obtained:

$$P(Z) \simeq P(\overline{A1})^*P(Z[\overline{A1}]) + P(A1)^*P(Z[A1]) \quad (45)$$

By applying the expression (42) to the expression (43), the cofactor probability of the output Z is expressed as follows:

$$Z\{xi\} \simeq \overline{A1}\{xi\}Z[\overline{A1}]\{xi\} + A1\{xi\}Z[A1]\{xi\}\ (i=1,\ldots,n) \quad (46)$$

To actually calculate these expressions, an MTBAM data structures for each of $Z[\overline{A1}]$ and $Z[A1]$ must be known. For this purpose, the Shannon's expansion theorem is applied to $Z[\overline{A1}]$ and $Z[A1]$. For example, $Z[A1]$ is expressed as follows:

$$Z[A1] = \overline{A2}\, Z[A1\overline{A2}] + A2 Z[A1 A2] \quad (47)$$

This expression is again subjected to the expressions (41) and (42). Sequentially repeating the Shannon's expansion theorem on the inputs A1 to Am will provide the MTBAM data structure for the output Z (step S101 of FIG. 1).

The switching probability of the output Z is calculated as follows:

$$PSWT(Z) \simeq 2P(Z(1))^*P(\overline{Z}(0)) \quad (48)$$

An MTBAM data structure for Z(1) is obtained by advancing time for each node of an MTBDD contained in the MTBAM data structure for Z(0) by one clock.

The above procedure is carried out on each gate from the primary input side toward the primary output side of the circuit, thereby obtaining an MTBAM data structure for covering all nets contained in the circuit. Accordingly, the MTBAM is a kind of an incremental method.

An algorithm for calculating the signal and switching probabilities of a given sequential circuit with the use of MTBAM data structures and the basic MTBAM expressions (41) and (42) will be explained.

When calculating the signal and switching probabilities of the circuit, the signal and switching probabilities of internal inputs are unknown. Accordingly, they must be calculated first. The signal probability of each internal input is calculable according to the conventional unroll feedback method. Once the signal and switching probabilities of the internal inputs are calculated, the internal inputs are considered as additional primary inputs, and the conventional probability calculation method for a combinational circuit is employed. Accordingly, the probability calculating algorithm for a sequential circuit is divided into the following three steps:

(1) calculating the signal probabilities of internal inputs;

(2) calculating the switching probabilities of the internal inputs; and (3) calculating the signal and switching probabilities of each combinational logic part.

Each of these steps will be explained in detail.

(1) Calculating the signal probabilities of internal inputs

It is supposed that an MTBAM data structure for each external input is known, and the unroll feedback method is carried out on the external inputs. Step 2 of the unroll feedback method employs the MTBAM when calculating probabilities. An MTBAM data structure for an external input A(i) (i=0 to k−1) is obtained by advancing time for each node of an MTBDD contained in an MTBAM data structure for an external input A(0) by one clock. This will be explained in detail.

1. Step 1 sets any value, for example, 0.5 for P(S(0)) and sets f=0.

2. Step 2 calculates the signal probability P(S(k)) of an output S(k) of an unrolled circuit according to the MTBAM.

3. Step 3 substitutes the calculated probability P(S(k)) for P(S(0)).

4. Step 4 increments f by one. If f<fmax, then step 2 is carried out, and if not, the procedure ends.

In this procedure, the MTBAM is characteristic in that the depth of an MTBDD contained in a given MTBAM data structure never exceeds an unroll number k. Accordingly, a storage space for the MTBDD in the MTBAM data structure is proportional to 2k at the maximum.

On the other hand, the prior art employing binary decision diagrams (BDDs) forms BDDs for the whole of an unrolled circuit, and therefore, needs a storage space of 2km at the maximum where m is the number of external inputs. Accordingly, the prior art is inapplicable to a large-scale sequential circuit involving a large number of external inputs. On the other hand, the size of a storage space for storing MTBDDs of the present invention is independent of the number of external inputs, and therefore, is applicable to large-scale sequential circuits.

Figure 6:
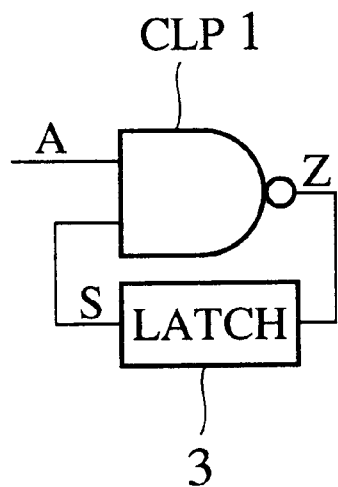
FIG. 6 shows an example of a sequential circuit.
Figure 7:
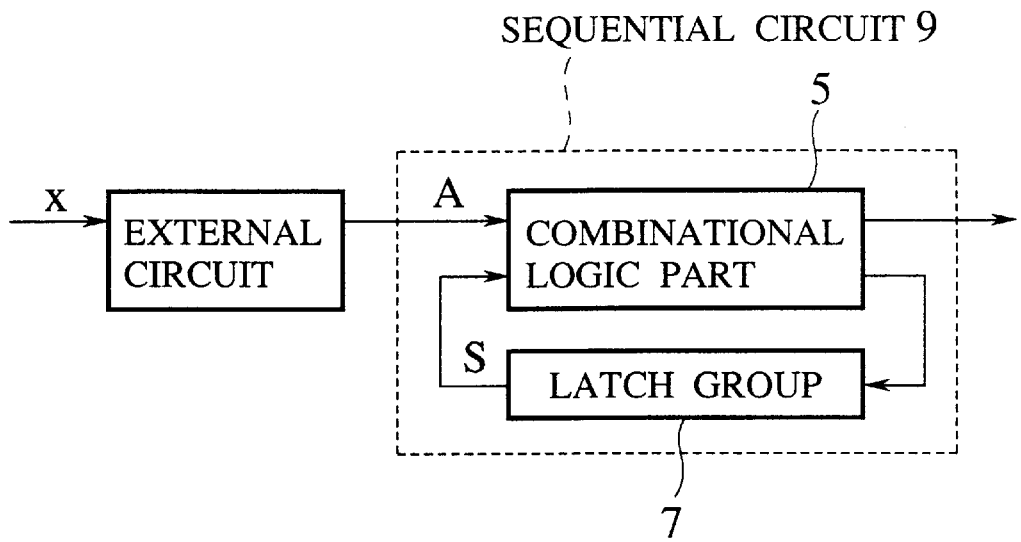
FIG. 7 shows a general structure of a sequential circuit.
Figure 8:
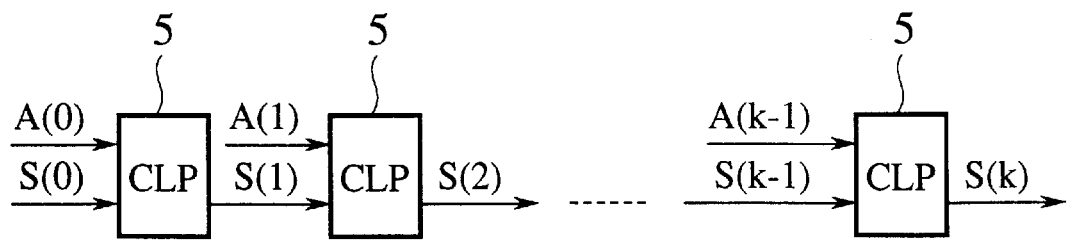
FIG. 8 shows an unrolled form of the sequential circuit.

FIG. 6 shows a sequential circuit whose signal probability is calculated according to the present invention (step S102 of FIG. 1). The circuit involves an internal input S, an internal output Z, and a primary input A. The primary input A is for the circuit as a whole and serves as an external input to a combinational logic part 1. The signal probability of the primary input A is supposed to be 0.5, and the switching probability thereof is supposed to be 0.8. In this case, the strict signal probability of the internal input S is about 0.583. This value is calculable according to a known method that is applicable to a small-scale circuit. An unrolled circuit is formed with an unroll number of 3, and the MTBAM and completely uncorrelated model (CUM) are applied to the unrolled circuit. Results are as follows:

$$P(S)MTBAM=0.588 \text{ (0.8\% error)} \tag{49}$$

$$P(S)CUM=0.667 \text{ (14.3\% error)} \tag{50}$$

where P(S)MTBAM is the signal probability of the internal input S calculated according to the MTBAM, and P(S)CUM is the same calculated according to the CUM. In this example, the BDD method will provide the same result as the MTBAM.

(2) Calculating the switching probabilities of the internal inputs (step S103 of FIG. 1)

The sequential circuit is unrolled once. An internal input S(0) is considered as an additional primary input, and the signal probability calculated previously is set for the input. The combinational logic part is processed according to the MTBAM, to provide an MTBAM data structure for an internal output S(1). This is used to provide the following switching probability of the internal input S:

$$PSWT(Si) \approx 2P(Si\ (1))*P(Si\ (0))\ (i=1, \ldots,) \tag{51}$$

(3) Calculating the signal and switching probabilities of each combinational logic part (step S104 of FIG. 1)

An internal input is considered as an additional primary input, and the signal and switching probabilities obtained previously are applied to the input. For remaining nets of the sequential circuit, the same probability calculations as those for a combinational circuit are carried out. If the depth of every MTBDD contained in the MTBAM data structure of an external input is 1 at the highest, the depth of every MTBDD contained in the MTBAM data structures of the nets of the sequential circuit is 1 at the highest.

Tests carried out according to the present invention will be explained. The tests were carried out with a SUN SPARC 10 workstation. ISCAS89 bench mark data was used for test circuits. The conventional completely uncorrelated model and the MTBAM of the present invention were implemented. An error between each test result and a switching probability obtained by a random simulation (SIM) was measured on each net. The calculation time of each program was measured. The length of a test vector used for the SIM was 10,000 clocks. The signal and switching probabilities of primary inputs were generated at random. An unroll number and a feedback number were each three. For each method, an error in a normalized power dissipation measure (NPDM) from the SIM was measured. The NPDM is the sum of products each of which is obtained by multiplying the number of fan-outs of a given net (the number of gates to which the net in question provides outputs) by the switching probability of the net in question. If wiring capacitance is ignorable and if gate input capacitance is fixed, the power consumption of the whole circuit is proportional to the NPDM. Accordingly, an error in the NPDM is equal to an error in an estimation (step S105 of FIG. 1) of the power consumption of the whole circuit.

Tables 1 to 3 show the results of the tests, in which table 1 shows an average of estimation errors in the switching probabilities of nets.

TABLE 1

| | Averaged error in estimated switching probabilities | |
|---|---|---|
| Circuit | CUM | MTBAM |
| s208 | 0.25 | 0.05 |
| s298 | 0.07 | 0.03 |
| s349 | 0.07 | 0.05 |
| s382 | 0.03 | 0.01 |
| s420 | 0.28 | 0.04 |
| s641 | 0.16 | 0.04 |
| s713 | 0.17 | 0.04 |
| s838 | 0.29 | 0.04 |
| s1423 | 0.14 | 0.08 |
| s5378 | 0.09 | 0.02 |
| s35932 | 0.11 | 0.09 |
| s38417 | 0.29 | 0.12 |

TABLE 2

| | Calculation time (seconds) | | |
|---|---|---|---|
| Circuit | SIM | CUM | MTBAM |
| s208 | 20.3 | 0.03 | 0.13 |
| s298 | 29.5 | 0.05 | 0.16 |
| s349 | 29.0 | 0.10 | 0.32 |
| s382 | 33.6 | 0.10 | 0.27 |
| s420 | 42.5 | 0.05 | 0.27 |
| s641 | 63.1 | 0.13 | 0.66 |
| s713 | 88.0 | 0.13 | 0.65 |
| s838 | 90.0 | 0.13 | 0.93 |
| s1423 | 125 | 0.23 | 3.32 |
| s5378 | 486 | 0.66 | 6.07 |
| s35932 | 3961 | 6.63 | 42.5 |
| s38417 | 3821 | 6.14 | 108.1 |

TABLE 3

| | Error (%) in estimated NPDM | |
|---|---|---|
| Circuit | CUM | MTBAM |
| s208 | 57.2 | −0.17 |
| s298 | 29.2 | −8.65 |
| s349 | 13.6 | 12.0 |
| s382 | 1.27 | −1.98 |
| s420 | 139 | 5.10 |
| s641 | 32.6 | 6.42 |
| s713 | 39.9 | 7.88 |
| s838 | 249 | 7.61 |
| s1423 | −15.2 | −3.71 |
| s5378 | −4.7 | 0.39 |
| s35932 | 15.0 | 9.00 |
| s38417 | 144 | 12.0 |

Tables 1 and 3 show that the MTBAM of the present invention is several times as accurate as the CUM. Sequential circuits have large temporal and spatial correlation among signals, and therefore, the present invention that considers the correlation is more accurate than the CUM that does not consider the same.

Table 2 shows that the probability calculating time of the present invention is about one hundredth of that of the logical simulator. This is because the present invention traces a whole circuit once in principle unlike the logical simulator that traces the same repeatedly.

As explained above in detail, the present invention provides a method of accurately estimating the power consumption of a semiconductor integrated circuit according to the multi-terminal Boolean approximation method (MTBAM) that correctly calculates switching probabilities.

The method of the present invention accurately and speedily estimates the switching probability of a sequential circuit at an estimation error of about one tenth of that of the prior art and a calculation time of about one hundredth of that of the logical simulator. Consequently, the present invention accurately estimates the power consumption of each logic part of the sequential circuit. Accordingly, the present invention allows a change in the designing of a sequential circuit or a selection of package in an earlier designing stage.

What is claimed is:

1. A method of estimating the power consumption of a semiconductor integrated circuit according to the signal and switching probabilities of nets (Ni: i=1 to m) in each of logic parts that form the integrated circuit, the signal and switching probabilities of each net (Ni) being calculated according to first data prepared for the net, the first data having a multi-terminal Boolean approximation method (MTBAM) data structure represented with an expression (1) mentioned below, comprising the steps of:

providing second data for primary inputs (Xi: i=1 to n), which are supplied to the logic part in question, and for front nets (Ni-1, Ni-2) that are present in front of the net (Ni) in question and determine a signal value of the net (Ni), the second data having the MTBAM data structure represented with the expression (1); and preparing the first data for the net (Ni) according to a probability contained in the second data, probabilities calculated according to third data contained in the second data and having a multi-terminal binary decision diagram (MTBDD) data structure represented with an expression (2) mentioned below, and fourth data generated from the third data and having the MTBDD data structure:

$$(1): P(AB) \simeq P(A)P(B) + \sum_{i=1}^{n} (P(A\{x_i\}B\{x_i\}) - P(A\{x_i\})P(B\{x_i\})),$$

$$(AB)\{x_i\} \simeq A\{x_i\}B\{x_i\} \quad (i = 1, \ldots, n).$$

$$(2): N\{x_i\} = \sum_{\alpha 1=0}^{1} \ldots \sum_{\alpha k=0}^{1} x_i^{\alpha 1}(0) \ldots x_i^{\alpha k}(k-1) \cdot P(N[x_i^{\alpha 1}(0) \ldots x_i^{\alpha k}(k-1)]).$$

2. The method of claim 1, wherein, if signal values of the nets (Nn) at a time point are determined by signal values of the nets (Nn) of a preceding time point, the second data is provided for a specific partial set of the nets (Nn) so that the first data is sequentially prepared for the nets (Nn).

3. The method of claim 1, wherein the third data having the MTBDD data structure consists of terminal nodes representing probabilities and non-terminal nodes representing input variables serving as logical function data, and the probability of the third data is calculated as the sum of products each calculated by multiplying a probability allocated to a branch from a root to a terminal node by a probability allocated to the terminal node.

4. The method of claim 1, wherein the third data having the MTBDD data structure consists of terminal nodes representing probabilities and non-terminal nodes representing input variables serving as logical function data, and the fourth data is generated as a negation of the third data so that a non-terminal node of the fourth data may have an input variable allocated to a corresponding non-terminal node of the third data, and a terminal node of the fourth data may have a probability that is calculated by subtracting 1 from a probability allocated to a corresponding terminal node of the third data.

5. The method of claim 1, wherein the fourth data having the MTBDD data structure is generated as the sum or product of data A and B each having the MTBDD data structure consisting of terminal nodes representing probabilities and non-terminal nodes representing input variables serving as logical function data, a non-terminal node of the fourth data being formed from a node of the data A and a node of the data B which are found according to a depth-first search technique and one of which is a non-terminal node, a terminal node of the fourth data being formed from a terminal node of the data A and a terminal node of the data B with a probability allocated to the terminal node of the fourth data being the sum or product of probabilities of the terminal nodes of the data A and B.

6. An estimation device for estimating a power consumption of a semiconductor integrated circuit according to the signal and switching probabilities of nets Nn (n=1 to n) in each of logical parts forming the semiconductor integrated circuit, the signal and switching probabilities of each net Ni being calculated according to first data prepared for the net, the first data having a multi-terminal Boolean approximation method (MTBAM) data structure prepared with an expression (1) mentioned below, the estimation device comprising:

providing means for providing second data for primary inputs Xn (n=1 to n) to be supplied to the logic part in question and for front nets Ni-1, Ni-2 that being present in front of the net Ni in question that determine a signal value of the net Ni, the second data having the MTBAM data structure represented with the expression (1); and preparing means for preparing the first data for each net Ni according to a probability contained in the second data provided for each of the front nets Ni-1, Ni-2, probabilities calculated according to third data contained in the second data and having a multi-terminal binary decision diagram (MTBDD) data structure represented with an expression (2) mentioned below, and fourth data generated from the third data and having the MTBDD data structure, $$(1): P(AB) \simeq P(A)P(B) + \sum_{i=1}^{n} (P(A\{x_i\}B\{x_i\}) - P(A\{x_i\})P(B\{x_i\})),$$

$$(AB)\{x_i\} \simeq A\{x_i\}B\{x_i\} \quad (i = 1, \ldots, n).$$

$$(2): N\{x_i\} = \sum_{\alpha 1=0}^{1} \ldots \sum_{\alpha k=0}^{1} x_i^{\alpha 1}(0) \ldots x_i^{\alpha k}(k-1) \cdot P(N[x_i^{\alpha 1}(0) \ldots x_i^{\alpha k}(k-1)]).$$

7. An estimation device for estimating a power consumption of a semiconductor integrated circuit according to the signal and switching probabilities of nets Nn (n=1 to n) in each of logical parts forming the semiconductor integrated circuit, the signal and switching probabilities of each net Ni being calculated according to first data prepared for the net, the first data having a multi-terminal Boolean approximation method (MTBAM) data structure prepared with an expression (1) mentioned below, the estimation device comprising:

providing means for providing second data for primary inputs Xn (n=1 to n) to be supplied to the logic part in question and for front nets Ni-1, Ni-2 that being present in front of the net Ni in question that determine a signal value of the net Ni, the second data having the MTBAM data structure represented with the expression (1);

preparing means for preparing the first data for each net Ni according to a probability contained in the second data provided for each of the front nets Ni-1, Ni-2, probabilities calculated according to third data contained in the second data and having a multi-terminal binary decision diagram (MTBDD) data structure represented with an expression (2) mentioned below, and fourth data generated from the third data and having the MTBDD data structure; and corresponding means for providing the second data for a specific partial set of the nets Nn so that the first data being sequentially prepared for the nets Nn executed by the preparing means when signal values of the nets Nn at time point "t" are determined by signal values of the nets Nn of a preceding time point, $$(1): P(AB) \simeq P(A)P(B) + \sum_{i=1}^{n} (P(A\{x_i\}B\{x_i\}) - P(A\{x_i\})P(B\{x_i\})),$$

$$(AB)\{x_i\} \simeq A\{x_i\}B\{x_i\} \quad (i = 1, \ldots, n).$$

$$(2): N\{x_i\} = \sum_{\alpha 1=0}^{1} \ldots \sum_{\alpha k=0}^{1} x_i^{\alpha 1}(0) \ldots x_i^{\alpha k}(k-1) \cdot P(N[x_i^{\alpha 1}(0) \ldots x_i^{\alpha k}(k-1)]).$$

\* \* \* \* \*